United States Patent [19]

Baars

[11] Patent Number: 4,751,031
[45] Date of Patent: Jun. 14, 1988

[54] METHOD AND AN APPARATUS FOR WATERPROOFING AND GASTIGHTENING A CABLE AND/OR TUBE PASSAGE IN A WALL OR THE LIKE, USING A FOAMABLE SYNTHETIC RESIN

[75] Inventor: Jan Baars, Montfoort, Netherlands

[73] Assignee: Chemische Industrie Filoform B.V., Holland, Netherlands

[21] Appl. No.: 924,278

[22] Filed: Oct. 29, 1986

[30] Foreign Application Priority Data

May 5, 1986 [NL] Netherlands ............... 8601145

[51] Int. Cl.⁴ .............. B29C 67/22; B29C 39/10
[52] U.S. Cl. ......................... 264/35; 52/221;
52/232; 264/46.5; 264/46.7; 264/46.9; 264/268;
264/272.15
[58] Field of Search ......... 264/35, 46.5, 46.7,
264/46.9, 268, 272.15; 52/221, 232

[56] References Cited

U.S. PATENT DOCUMENTS 2,892,013  6/1959  Gomberg ................... 264/35 X
4,237,667 12/1980  Pallucci et al. .............. 52/221
4,277,532  7/1981  Czepel et al. ............. 52/232 X
4,363,199 12/1982  Kucheria et al. ............ 52/221
4,431,198  2/1984  Beinhaur et al. ......... 52/221 X
4,607,469  8/1986  Harrison .................. 52/232 X

FOREIGN PATENT DOCUMENTS 3411642 10/1985  Fed. Rep. of Germany .
2406903  5/1979  France .
2501926  9/1982  France .

*Primary Examiner*—Philip Anderson
*Attorney, Agent, or Firm*—Murray and Whisenhunt

[57] ABSTRACT

A method and an apparatus for waterproofing and gastightening a cable or tube passage (9) in a wall (11) or the like, using a foamable synthetic resin (8). A box-shaped or cover-shaped element, e.g. a cap (1, 2) is attached to one side of the wall, after which through an opening in cap (1, 2) the foamable resin (8) is supplied therein and the opening is stopped. The cap (1, 2) may consist of two parts (1, 2) and the two parts may be provided with rupturable closures or closable openings.

19 Claims, 2 Drawing Sheets

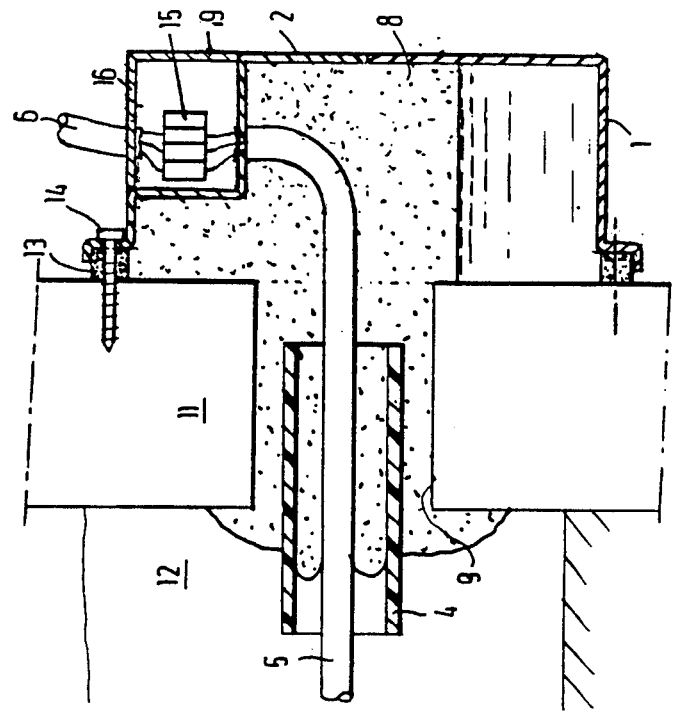
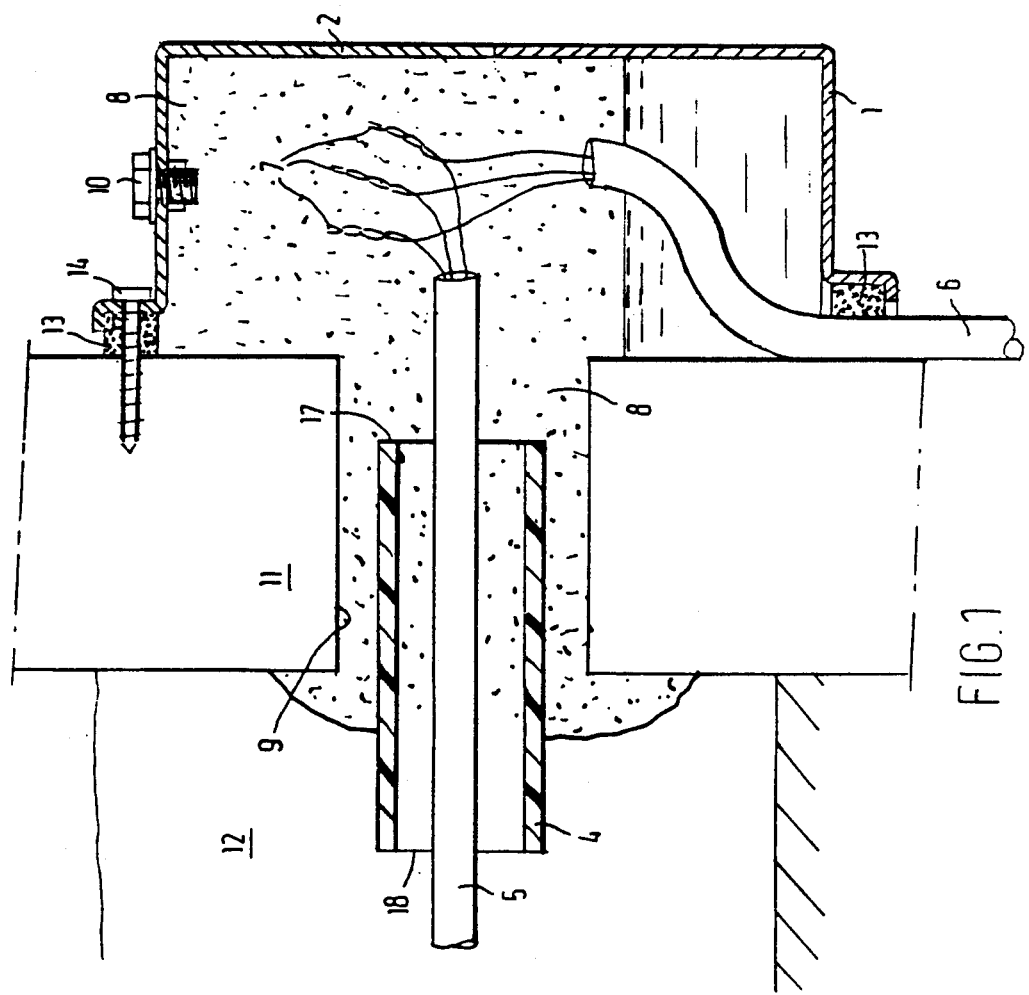

METHOD AND AN APPARATUS FOR WATERPROOFING AND GASTIGHTENING A CABLE AND/OR TUBE PASSAGE IN A WALL OR THE LIKE, USING A FOAMABLE SYNTHETIC RESIN

The present invention relates to a method of waterproofing and gastightening a cable passage in a wall or the like, using a foamable synthetic resin and to an apparatus for performing the method.

A similar method is known from Applicants' prior Dutch patent application No. 86,00689, describing a method of fitting a stopper in a pipe or tube, a wall bushing or the like, using two disc-shaped elements to be spaced apart in the tube, and a tubular element having a tubular portion with a diameter smaller than that of the pipe, tube or the like member to be stopped, the closed ends of which tubular element are provided with an outwardly extending flange. Prior to fitting the assembly in the pipe or tube to be stopped a foamable liquid is introduced through an opening in the tubular portion. The assembly also includes collars of an open-celled material disposed on the inside of the flanges but having a larger diameter than the flanges, so that they allow the passage of conductors or tubes, while nevertheless preventing the foaming resin from flowing away over the flanges along the conductors or tubes.

A drawback of this known method is not only that it is expensive but especially that there has to be provided a hole having a clean wall to ensure that the foamed material properly adheres to the wall of the hole.

It is an object of the present invention to render this method suitable for application in cable passages in walls, the inner wall of which cannot be cleaned or insufficiently so.

To that end, the present invention provides a method which comprises attaching a box-shaped or cover-shaped element, e.g. a cap to one side of the wall, thereby closing the wall passage, thereafter supplying foamable synthetic resin through an opening in the cap, and closing said opening.

A tube or bushing can be inserted through the drilled hole prior to the attachment of the cap to the wall. The end of the tube inserted through the hole is closed, so as to prevent the tube from being filled with earth, sand or grit. In the case of a cable bushing, the other end comes to lie between the inner surface and the outer surface of the wall. The purpose thereof is, in the case of too narrow a hole, when it is not sure that the tube is entirely embraced by the foaming resin and hence waterproofness is not ensured, to ensure that at least the portion of the hole without the tube is filled up with the waterproof foam, which adheres to the wall of the hole.

The cap contains closable and/or rupturable openings for an easy passage of wires or tubes or for supplying liquid synthetic resin.

In a preferred embodiment of the present invention, the cap is attached to the wall by means of a thread or filament of synthetic plastics, rubber or like material and the cable passed through.

The present invention further relates to an apparatus for performing the above described method and is characterized by a conical cap made of flexible synthetic plastics, having a closable filling hole, said cap having a wall-engaging rim provided with a sealing ring of open-celled material.

Such a cap can be attached to the cable passed through by means of a thread or filament of synthetic plastics, rubber or like material. By attaching the thread or filament to the cable at some distance in front of the cap, and then winding it towards the cap, the latter will be pushed, and held firmly against the wall by the stiff turns of the plastic filament or thread. The end of the thread or filament can then be secured by means of adhesive tape also serving to seal the respective cap end relative to the cable passed through.

For an easy attachment of the cap, this may be provided with an axial split containing means for interconnecting the respective axial longitudinal edges of the split. Said means may take the form of an H-section member, and pins for interconnecting the axial longitudinal edges of the split via aligned openings in said longitudinal edges and the H-section. By selecting an angle of about 45° between the wall and the axis of the conical cap, it is ensured that the cap is properly pressed against the wall.

As the cap is secured using a thread or filament of synthetic plastics, rubber or the like material, a sufficient frictional force is produced to ensure that the cap is not pressed away during the foaming of the synthetic plastics material. Naturally, the peripheral edge of the conical cap may be provided with holes for securing the cap to the wall, which is desirable when the cap is used for stopping a wall opening and not for stopping an opening through which a cable extends, unless the latter lies loose and offers no hold for attachment of the cap by means of a wire.

In order to easily adjust the cap passage to the diameter of the cable passed through, the cap may be provided with a graduation.

According to another embodiment of the present invention, the apparatus for performing the method described in the above alternatively comprises a cap composed of two parts both having rupturable closures or closable openings. For proper sealing relative to the wall, the cap may be provided with a sealing ring of open-celled material.

The cap described above can also be employed to provide a closure in a pipe, tube or wall bushing or the like, using two spaced apart caps to be installed in the hole concerned.

The wall has to be cleaned around the opening, so as to obtain a good adherence of the foamed synthetic resin to the wall.

The advantage of this method is that a properly adhering and waterproof and gastight cable and/or tube passage can be obtained in a relatively simple manner. This is especially important as the work has often to be carried out under difficult conditions. It is sufficient to drill a hole in a wall, to pass the tube stopped at one end therethrough, to ensure that the tube is situated some centimeters deep within the wall (in the case of a cable passage), to clean the surroundings of the hole, to fit the cable through the wall and the tube, to make the connections to the inner cable and, in the case of a gas pipe passage, to make the connection to the inner pipes, to attach the cap to the wall to pour the foamable resin into the cap and to close the opening in the cap.

To prevent the resin from leaking away along the tube so long as it has not yet expanded it has to be ensured that the bottom of the cap is fitted sufficiently far underneath the opening in order that the volume enclosed by the wall surface and the cap and situated underneath the lower edge of the hole can contain the quantity of liquid synthetic resin supplied.

When the diameter of the hole on the outside of the wall is larger than the outer diameter of the tube, it is possible to fit a collar of an open-celled material between the tube and the hole. This open-celled material then ensures that the foaming resin that would reach the outside of the wall through the hole is retained.

Two embodiments of apparatus for making a waterproofed closure of a cable passage in wall according to the present invention will now be described, by way of example, with reference to the accompanying drawings, in which:

FIG. 1 is a cross section of apparatus for waterproofing a cable passage through a wall;

FIG. 2 is a corresponding cross section of another embodiment according to the present invention;

Figure 3:
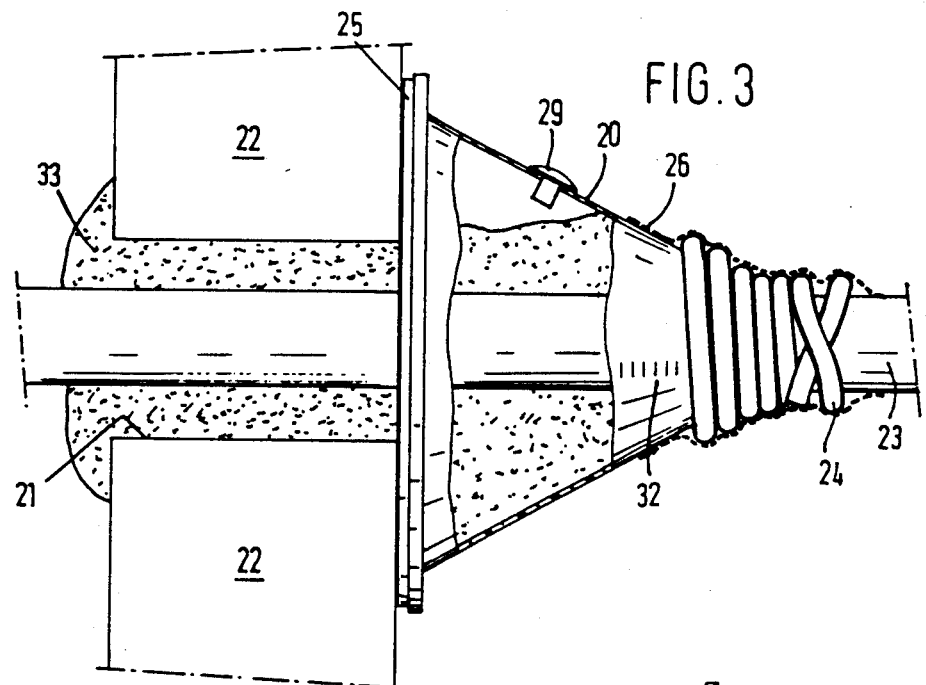
FIG. 3 is a cross section similar to FIG. 1 and showing a third embodiment.

As shown in the drawing, the following procedure is followed for making a waterproofed and gastight cable passage, first, a hole 9 is drilled in a wall 11, after which a tube 4, whose end that comes to lie in the outside soil 12 is stopped (not shown), is pushed or hammered outwards through the hole (in the drawing from the right to the left). The stopper ensures that the tube is not clogged with soil, grit or sand. The tube 4 is pushed or hammered so far into the wall that the edge 17 is located between the inner surface and the outer surface of the wall 11. The tube stopper (not shown) is now removed, so that an outer cable 5 can be pushed through tube 4 inwards. When the diameter of the hole on the outside of the wall is much larger than the outer diameter of the tube, a collar of an open-celled material can be installed between the tube and the hole of the outside. Then a start can be made with the provision of electrical connections 7 (connectors) between the wire of the outer cable 5 and those of the inner cable 6. The manner in which this is effected is of little relevance here. Also, the wall is cleaned on the inside around the opening 9, so as to ensure a good adherence between wall 11 and the foaming material to be described hereinafter. After cleaning the wall, a cap consisting of two parts 1 and 2 is attached to the wall, e.g. by means of screws 14. The cap has a cut-out or opening, not shown, through which the inner or house cable 6 can be passed. The sealing of the cap relative to the wall is ensured by a sealing ring 13 of an open-celled material. After cap 1, 2 has been attached to the wall 11, a foamable resin 8 is poured into cap 12, to which end first a stopper 10 is removed, after which the foamable resin 8, e.g. a two-component resin, is poured into cap 1, 2 whereafter stopper 10 is reinstated.

Cap 1, 2 should be installed in such a manner that the volume of the quantity of resin poured into cap 1, 2 does not exceed the volume enclosed by the inner surface of wall 11 and cap 1, with the level of the liquid resin remaining below the lower edge of hole 9, since otherwise the not-yet-foaming resin will leak away into hole 9, with the result that the space between wall 11 and cap 1, 2 and the space in hole 9 and between the inner wall of tube 4 and the outer cable 5 and between tube 4 and the inner wall of hole 9 is not completely filled with foam 8 so that the waterproofness is not ensured.

When cap 1, 2 is installed properly, the foaming resin 8 will first entirely fill up the space between cap and wall, and subsequently penetrate into hole 9 and tube 4, between the inner wall of tube 4 and the outer cable 5.

FIG. 2 shows a different embodiment of cap 1, 2. The difference from the cap shown in FIG. 1 is that the connectors 15 are situated in a space 16 formed by means of a cover 19 outside cap 1, 2. The cover is connected to cap 1, 2 in a conventional manner, not shown. The connectors can now be covered separately; this embodiment, however, has the advantage that the connectors do not lie in the foamed synthetic resin and thereby remain "easily" accessible.

Figure 4:
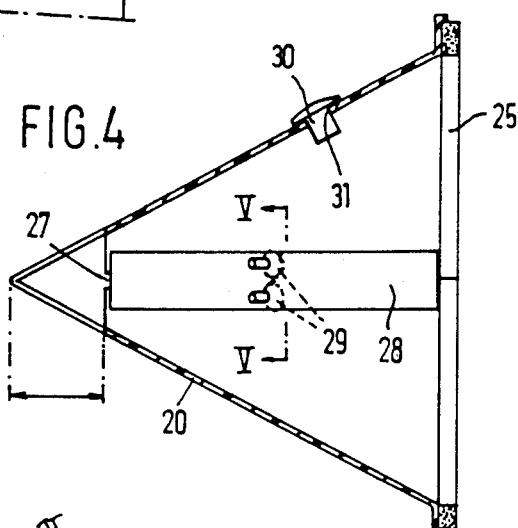
FIG. 4 is a part-sectional view of a conical cap with an H-section sealing member used in the apparatus shown in FIG. 3.
Figure 5:
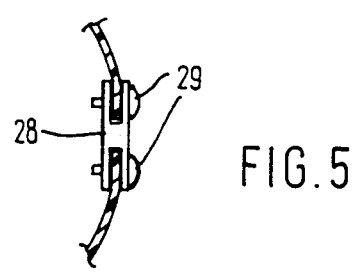
FIG. 5 is a cross sectional view taken on the line V—V of FIG. 4.

FIGS. 3–5 show an embodiment of the application of a conical cap 20 is sealing a passage 21 in a wall 22. Through the wall passage extends a cable 23. Conical cap 20 is attached to the cable 23 by means of a flexible synthetic plastics thread or filament (e.g. of PVC). The thread or filament is fastened to cable 23 by means of a clove hitch or the like and subsequently filling up the space between the first turn and the conical front of the cap by adjoining turns. By slightly tightening or stretching the thread or filament during this procedure, the conical cap 20 is pressed against the wall 22. Proper sealing relative to the wall can be accomplished by fitting the rim of the conical cap with a sealing ring 25 of open-celled material.

The end of wire 24 is attached to the conical cap by taping the "knot" with a tape diagrammatically shown at 26, which can also ensure a sealing of the cap end relative to cable 23.

To facilitate making a correct aperture for the passage of the cable, the conical cap is provided with a graduation 32, so that the end of the conical cap can easily be sawn to size.

As shown in FIGS. 4 and 5, the conical cap has a split 27 through which the cap can be easily installed. The two longitudinal edges of split 27 are kept together by an H-section member 28 and pins 29 extending through openings, not shown, in the H-section member 28 or the respective edges of the split.

In the same way as discussed in the above, the conical cap is provided with a filling hole 31 stoppable by a plug 30.

Although not shown in the drawing, bores may be provided in the peripheral rim of the conical cap and the ring 25 attached thereto for screwing the conical cap to a wall.

Although not shown in the drawings the conical surface of the cap preferably makes an angle of 45° with the axis of the cap. This makes for a good attachment of the cap relative to the cable or the wall. When this angle is chosen too small, the cap will not be properly pressed against the wall by winding filament 24 around the cable. If, on the other hand, too steep an angle is chosen, the same effect will occur.

After the installation of the conical cap in the above described manner, a liquid foamable synthetic resin (shown in FIG. 3 in cured condition and indicated at 33) can be introduced therein and the filling hole can be stopped or otherwise closed.

The use of the conical cap of flexible synthetic plastics material (polyehtylene, polypropylene, PVC and the like) has the advantage that this makes it possible to easily take up out-of-roundness of the cable or to pass through two or more cables. Also an eccentric arrangement of the cable relative to the wall bushing can be realized without any problem.

It will be clear in view of the above that many modifications are possible without departing from the scope of the inventive idea, in particular with regard to the form of the cap and its attachment to the cable or to the wall.

I claim:

1. A method for forming a water and gas tight seal around an elongated element protruding through a hole in a wall member such that there is space between the said element and the said hole, consisting essentially of:
   (1) placing a substantially fluid tight cap, having a peripheral edge, in juxtaposition to the wall member such that the peripheral edge abuts only the wall member and at least the lower portion of the peripheral edge forms a substantially fluid tight seal with only the wall member, whereby the peripheral edge is spaced from and so surrounds the said hole that fluid communication is provided between the hollow portion of the cap and the entire hole in the wall member;
   (2) placing a sufficient quantity of a foamable liquid resin into said cap such that, upon foaming, the foamed resin fills the space between the said hole and the said element and at least partially fills the said cap; and
   (3) allowing the foamable resin to foam.

2. A method according to claim 1, wherein the underside of the cap is provided with a space so that the volume enclosed by the wall and the cap and located below the hole is sufficient to contain the quantity of liquid resin placed in the cap.

3. A method according to claims 1 or 2, wherein the cap is attached to the wall by a the threaded means.

4. A method according to claims 1 or 2, wherein the cap has a generally conically configured portion, the elongated element protrudes through the apex of the conically configured portion and the cap is held in juxtaposition to the wall by a filament tightly wrapped about the said element near its protrusion through said cap and tightly wrapped about the cap near the protrusion of the said element, such that the cap is forced toward said wall.

5. A method according to claims 1 2, or wherein the said elongated element is contained within the said cap and the cap is held in juxtaposition to the wall by threaded means.

6. A method according to claim 4, wherein the cap has an opened axial split, the cap is positioned around the protruding element with a portion of that element protruding through the apex of the conically configured portion of the cap, the cap is provided with means for closing the said split, and the split is closed after said positioning of the cap.

7. A method according to claim 1 wherein the elongated element is a conduit.

8. A method according to claim 1 wherein the elongated element is an electrical wire or cable.

9. The method of claim 1 wherein the elongated element is a conduit having disposed therethrough an electrical wire or cable.

10. The method according to claim 9 wherein both the conduit and the electrical wire or cable are sealed with the water and gas tight seal.

11. An apparatus for forming a water and gas tight seal around an elongated element protruding through a hole in a wall member such that there is space between the said element and the said hole, comprising:
    (1) a substantially fluid tight hollow cap adapted to be placed in juxtaposition to the wall member in a substantially fluid tight manner, at least at the lower portion thereof, so that the cap surrounds the said hole and the protruding portion of the elongated member;
    (2) means within the cap when the cap is in juxtaposition to the wall for receiving and containing a sufficient quantity of foamable liquid resin such that, upon foaming, the foamed resin fills the space between the said hole and the said element and at least partially fills the said cap; and
    (3) means for holding the said cap in juxtaposition to said wall.

12. An apparatus according to claim 11, wherein the cap has a generally conically configured portion having an opening at the apex thereof adapted to receive and pass therethrough a protruding portion of the said elongated element.

13. An apparatus according to claim 12, wherein the means for holding said cap in juxtaposition to the wall includes a filament adapted to be tightly wrapped about the said element near its protrusion through said cap and tightly wrapped about the cap near the protrusion of the said element, such that the cap is forced toward said wall.

14. An apparatus according to claim 12, wherein the cap is provided with an axial split, and closing means are provided for interconnecting the respective axial longitudinal edges of the split.

15. An apparatus according to claim 24, wherein the closing means includes a H-section closing member and pins for interconnecting said longitudinal edges via aligned openings in the axial longitudinal edges of the split and the closing member.

16. An apparatus according to claim 12, wherein the angle between the wall and the axis of the conically configured portion of the can is about 45 degrees.

17. An apparatus according to claim 12, wherein the conically configured portion of the cap is provided with graduations so that a portion of the cap may be removed and provide a diameter of the said opening which closely approximates the diameter of the said elongated element passing therethrough.

18. An apparatus according to claim 11, wherein the cap is provied with a sealing ring of an open-celled foamed material adapted to form a seal between the cap and the wall.

19. An apparatus for forming a water and gas tight seal around a hole in a planar wall member, comprising:
    (1) a substantially fluid tight cap in the configuration of a closure having one opened end, said one opened end being of a size and configuration such that the periphery of the opening will entirely surround the hole in the wall member and the periphery is planar such that the periphery will fit in close juxtaposition to the planar wall member adjacent said hole;
    (2) an opened-cell, foamed seal disposed entirely around the said periphery such that the cap can be sealed to the wall member in a manner which substantially prevents liquid egress through said seal, at least at the lower portion thereof, but which allows gaseous egress through the opened cells of said foamed seal;
    (3) means for securing said cap to said wall member such that sealing of the cap to the wall member is provided;

(4) a stoppered filling hole passing through an upper portion of the cap for introducing a foamable liquid resin into said cap when said cap is sealed to said wall member; and
(5) means within the cap, when the cap is sealed to the wall, for receiving and containing a sufficient quantity of a foamable liquid resin such that, upon foaming, the foamed resin fills the hole in the wall member and at least partially fills the said cap.

* * * * *